May 23, 1961
C. D. GILMORE
2,985,119
PROCESS OF MAKING THOROUGHLY COOKED DOUGHNUTS
HAVING MORE THAN THREE HOLES
Original Filed April 27, 1953
3 Sheets-Sheet 1
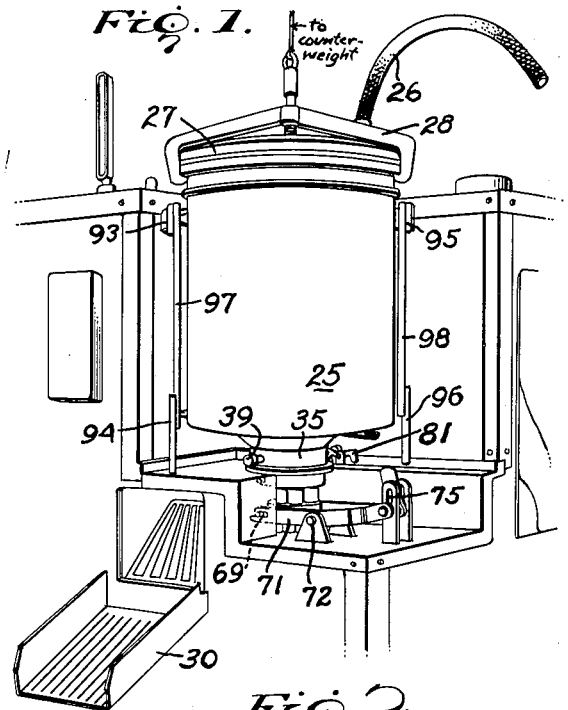
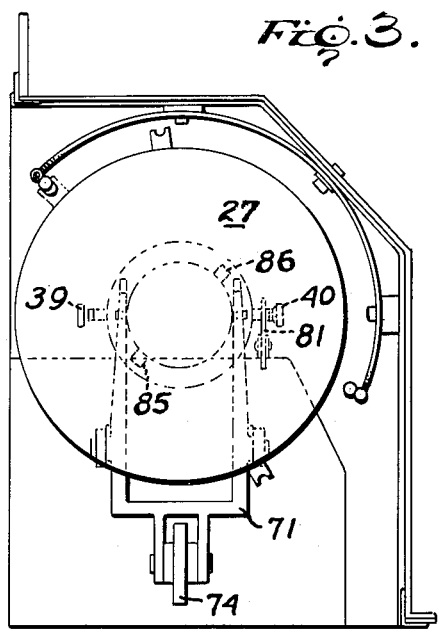
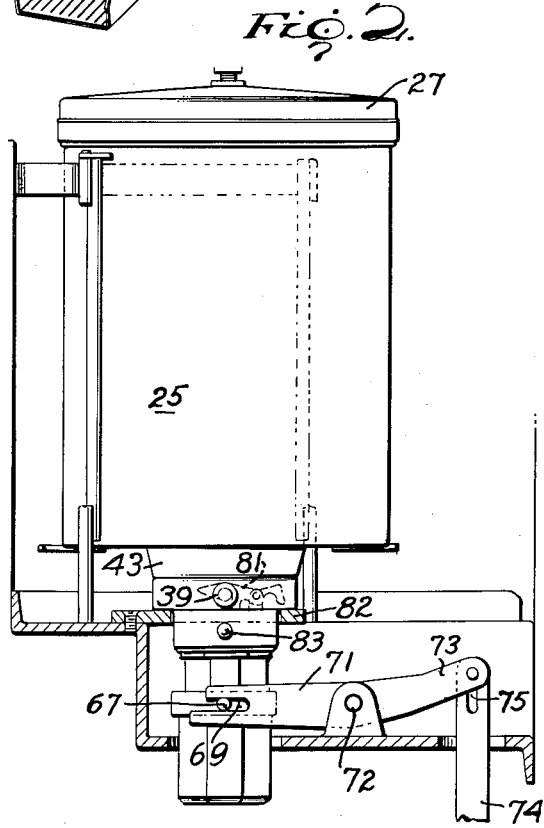
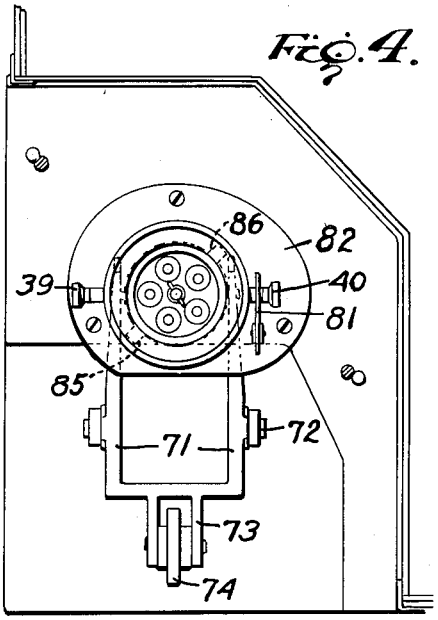
INVENTOR
Chace D. Gilmore
By Philip E. Siggers
atty.

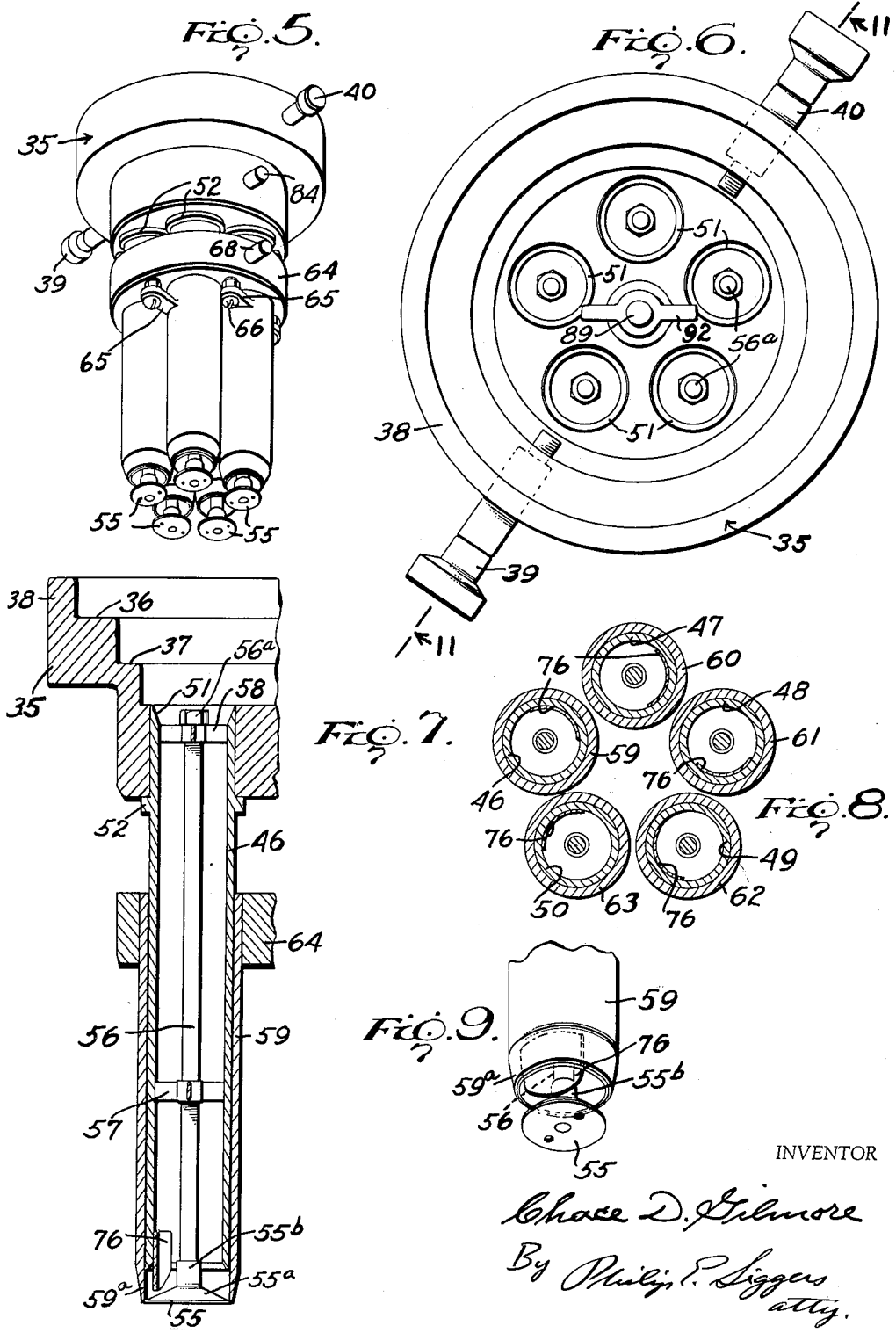

May 23, 1961 C. D. GILMORE 2,985,119
PROCESS OF MAKING THOROUGHLY COOKED DOUGHNUTS
HAVING MORE THAN THREE HOLES
Original Filed April 27, 1953 3 Sheets-Sheet 3

INVENTOR
Chase D. Gilmore
By Philip P. Liggen
atty.

United States Patent Office 2,985,119
Patented May 23, 1961

2,985,119
PROCESS OF MAKING THOROUGHLY COOKED DOUGHNUTS HAVING MORE THAN THREE HOLES

Chace D. Gilmore, 219 S. Mechanics St., West Chester, Pa.

Original application Apr. 27, 1953, Ser. No. 351,087, now Patent No. 2,915,992, dated Dec. 8, 1959. Divided and this application Oct. 7, 1959, Ser. No. 844,977

2 Claims. (Cl. 107—54)

This application is a division of my application Serial No. 351,087 filed April 27, 1953, now Patent No. 2,915,-992 dated Dec. 8, 1959, entitled "Die Attachments for Doughnut-Making Machines."

An object of the invention is to provide a method of making thoroughly cooked doughnuts having more than three holes. An example of such a doughnut is shown in my design Patent No. 180,900 dated September 3, 1957.

It is well known that ordinary doughnuts are frequently not thoroughly cooked because the heat of the cooking oil does not act on the central zone of the doughnut dough shape for a sufficient length of time. This heat will usually overcook the outside surface of the doughnut shape if the inside thereof is thoroughly cooked. If the doughnuts are over-cooked, they will blacken and become unsalable. Usually the doughnut makers are compelled to cook the doughnuts only long enough to give a satisfactory appearance to the outside skin of the doughnuts; what is on the inside is quietly ignored. But an incompletely cooked doughnut often causes indigestion and frequently after a few such attacks the customer decides doughnuts are inherently indigestible and should be avoided. In this way the doughnut manufacturers lose thousands of customers.

The present invention provides a doughnut so shaped and formed that it is thoroughly cooked and may be digested by anyone in normal health. The doughnuts are so made that they may be separated or broken by the fingers into several "bite-size" pieces, which is a further advantage of my process.

In the accompanying drawings I have shown some of the machinery which may be used to produce doughnuts in accordance with the inventive process.

In said drawings:

Fig. 1 is a perspective view of part of a prior art doughnut-making machine equipped with the die attachment of the aforesaid patent;

Fig. 2 is an elevation of the dough can, the cutter sleeve, the pivoted yoke, and certain associated parts;

Fig. 3 is a top plan view on a larger scale showing the pivoted yoke for operating the cutter sleeve of the doughnut-forming device, and showing certain associated parts of the prior art machine;

Fig. 4 is a top plan view like Fig. 3 but showing a different view of the parts;

Fig. 5 is a perspective view of one form of die attachment useful in performing the inventive process;

Fig. 6 is a top plan view of the parts of Fig. 5, scale about full size;

Fig. 7 is a full size sectional elevation of one of the five dough-extruding tubes;

Fig. 8 is a cross-section through the lower ends of the five dough-extruding tubes;

Fig. 9 is a detail in perspective showing the lower end of one of the dough-extruding tubes;

Figure 12:
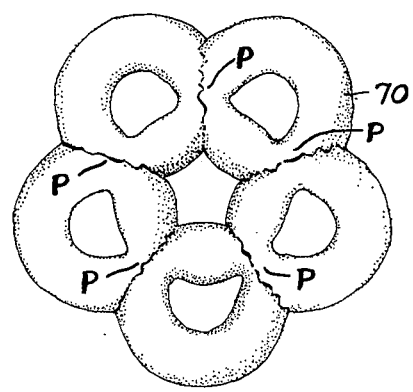
Fig. 12 is a plan view, on a reduced scale, of a doughnut made with the die attachment of the preceding figures.
Figure 10:
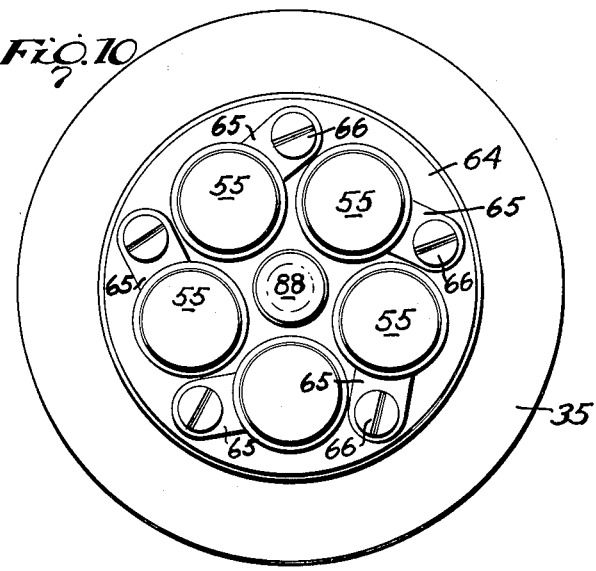
Fig. 10 is a bottom plan view of the attachment, scale about full size.

Before proceeding with a detailed description of the apparatus, it should be explained that Figs. 1 to 11 inclusive are the same as Figs. 1 to 11 inclusive of the aforesaid Patent No. 2,915,992 dated Dec. 8, 1959. Also disclosed in said patent, but not shown here, is a second form of die attachment for making the same kind of doughnuts; this second form being the form of Figs. 13–23 inclusive of the parent case. Both die attachments were designed for use with commercial doughnut-making machines of the type shown in the Bergner Patents Nos. 1,492,542 and 1,727,857, and the Hunter Patent No. 1,817,887.

This prior art machine comprises a hermetically-sealed dough can (or "magazine"), shown at 25 herein, said dough can having a compressed air line 26 coupled to its cover 27, which is clamped in position and has a gasket (not shown) to hold the air pressure. A yoke 28 straddles the cover and a counter-weighted cable (which extends around an overhead system of pulleys to a heavy weight, not shown) makes it possible to raise the dough can manually even when full of dough. The air line 26 extends to a compressed air tank, which with the air pump, electric motor for driving the pump, safety valve, bleed valve, air gauge, etc., are omitted as being well understood by those skilled in the art. The described dough can is designed to be partly filled with a doughnut mix, not shown, and when closed and sealed, is designed to extrude the dough (because of the air pressure) through one of the forming dies of my patented invention, thereby forming a dough shape which drops by gravity into a bath of hot cooking oil (not shown) kept at an even temperature by means of a thermostatically controlled electric heater element (not shown). While floating in this bath of hot oil the dough shapes are forced to travel in a circular path and are turned over; then the doughnuts are lifted out, drained and discharged by means of chute 30 (Fig. 1) onto a conveyor, for example, where the hot doughnuts may cool somewhat before being wrapped or packaged. These details are omitted from the drawings as they form no part of my invention.

The illustrated form of die attachment to be described is designed to be releasably secured on the lower end of one of the dough cans 25 of a prior art machine, and is best shown in Figs. 5–11 inclusive. At its upper end, the die attachment has a heavy metal collar 35 which is circular in plan (Fig. 6) and has a plurality of circular shoulders 36, 37 (Fig. 7) permitting the collar to fit complemental surfaces provided on the lower end of the dough can. Shoulders 36, 37 and the end flange 38 provide a sealing connection between the attachment and the dough can, so that all the dough subjected to air pressure must flow through the attachment and its extrusion die members to form doughnuts of the shape desired.

A pair of locking pins 39, 40 are slidable in bores 41, 42 provided at diametrically opposite points in collar 35; each locking pin has an enlarged head to facilitate pulling it out to disengage its inner reduced end from bores (not shown) provided in the complemental or male part 43 (Fig. 2) of the dough can. Springs 44, 45 respectively project the inner reduced ends of the locking pins 39, 40 into bore-engaging position to lock the die attachment rigidly on the dough can while permitting quick manual detachment thereof at any time.

Figure 11:
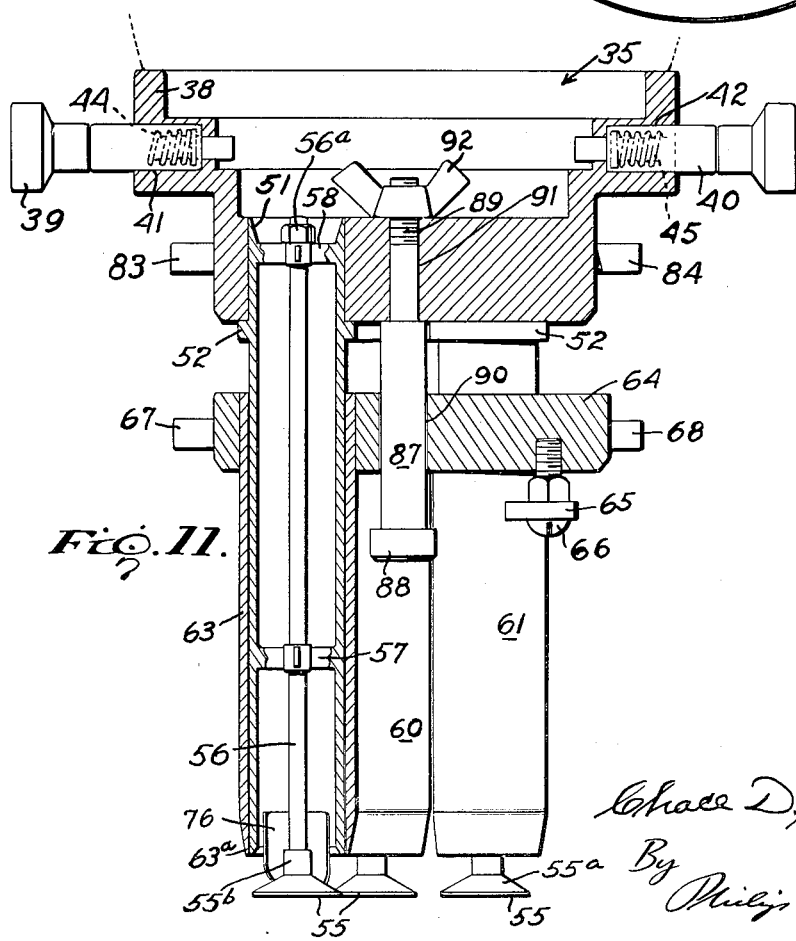
Fig. 11 is a section on line 11—11 of Fig. 6.

Secured by press-fitting (or otherwise) to the lower part of collar 35 are a plurality of thin metal die tubes 46, 47, 48, 49 and 50. While five tubes are shown, and this is the preferred number, there may be as few as three or as many as nine. If only three tubes are provided, each tube will be materially larger in diameter than the tubes 46–50; whatever their number, each die tube is cylindrical, is made of smoothly polished metal, is straight, and has a beveled upper or inlet end 51, as well as an integral flange 52 abutted against the underside of collar 35. Each die tube further has a valve seat 55 adjacent to but outside of its lower end, each valve seat or disk 55 having a beveled or frusto-conical inner face 55$^a$ and a tapped boss 55$^b$ by which it is screwed or pinned to the lower end of a stem 56. Stems 56 are straight rods which pass through spiders 57 fixed inside the die tubes, and also through spiders 58 fixed at the upper ends of the die tubes on the inside; these spiders are plural-armed spacers and braces which hold each stem 56 in the center of the die tube and allow the dough to flow past them down the die tube and out of it when the cut-off valves permit such flow. As shown in Figs. 7 and 11, the stems 56 are held against longitudinal movement by means of nuts 56$^a$ screwed on their upper ends and abutting the top sides of spiders 58. When nuts 56$^a$ are unscrewed, stems 56 may be withdrawn from die tubes 46–50 by sliding them out the lower ends of said tubes.

Slidably mounted on the outside of each die tube and closely fitting the same are sleeves 59, 60, 61, 62 and 63 respectively. The sleeves are secured at their upper ends to an annular collar 64 and are easily disconnected therefrom. As shown, each sleeve 59–63 has an ear 65 fixed thereto and projecting laterally, with a stud 66 passed through a perforation in the ear and screwed into the bottom of annular collar 64. See Figs. 5, 10 and 11. A pair of diametrically opposite pins 67, 68 are fixed to and project outwardly from annular collar 64, and said pins are received in slots 69, 70 on the ends of a yoke 71 (Figs. 1–4) which is pivoted at 72 upon a fixed part of the machine. (Yoke 71 is also a prior art element.) Yoke 71 has an arm 73 adapted to swing in a vertical plane, and a vertically reciprocated link 74 has a slot-and-pin connection 75 with the free end of arm 73. Link 74 is intermittently reciprocated by a cam mechanism as is known in the prior art and hence not illustrated. Obviously rocking of yoke 71 will cause the assembly consisting of annular collar 64 and sleeves 59–63 to reciprocate vertically on the die tubes 46–50. In its lowest position, each sleeve 59–63 will contact a valve seat 55 as shown in Fig. 7. In their uppermost positions, sleeves 59–63 will be spaced above valve seats 55 as shown in Figs. 5, 9 and 11: this spacing will permit the soft dough mix to be extruded responsive to the pneumatic pressure previously mentioned. It will now be clear that the slidable sleeves are actually cut-off valves. As shown in Figs. 7, 9 and 11, the lower ends of sleeves 59–63 are beveled to provide circular knife edges (59$^a$, 60$^a$, 61$^a$, 62$^a$ and 63$^a$) to cooperate with the valve seats 55 to cut off the dough cleanly.

One of the features of the illustrated form of die assembly is best shown in Figs. 7 and 11 and consists of thin baffles 76 brazed or otherwise secured to the inside of each die tube. The function of these thin baffles or barriers is to prevent excess dough mix from flowing at certain points out of the die tubes, which would form upstanding knobs on the dough shape which is to be fried in the hot oil. To understand this, reference should be made to Fig. 12, where the product of the invention is shown in plan. As there seen, the doughnut product 70 is essentially five small doughnuts joined together, each little doughnut having part of its body merged on opposite sides with parts of the bodies of two other doughnuts. If the thin baffles 76 or their equivalents are not used, an excess quantity of dough above what is needed at each junction point P may be extruded by the die assembly. This excess dough may build up on top of the dough product to form knobs and after the cooking in hot oil, a hard, high protuberance or knob is left at each junction point, which is most objectionable for three reasons, namely, it mars the appearance of the doughnut, wastes dough, and makes packaging difficult and costly. To understand better the last-mentioned objection, it should be explained that these undesirable knobs would practically double the thickness of the doughnut at five points, increasing the amount of necessary wrapping or packaging material and making the actual handling of the doughnuts during packaging far more complicated. The simple provision of the thin baffles 76 cuts down the flow of dough in certain directions during extrusion, so that only the proper amount flows to each junction point P and no knobs are formed. In other words, the doughnuts formed by the described die attachment are of substantially equal thickness at all points, and may be packaged as readily as any comparable bakery product.

As previously explained, the spring actuated locking pins 39, 40 lock the die assembly upon the lower end of the dough can; this prevents separation of these parts and also rotation or oscillation of the die assembly. To prevent rotation of the suspended dough can, a gravity latch 81 (Figs. 1–3) is pivotally mounted on a fixed horizontal shelf 82 which is part of the prior art machine. Latch 81 is so designed that it automatically lifts and then drops to lock over the shank of pin 40 when the dough can and die assembly are turned to bring pin 40 against latch 81. To prevent the dough can and die assembly from rising automatically responsive to the counterweight previously mentioned (which could occur when the dough can has discharged its contents) the heavy metal collar 35 is provided with a pair of diametrically opposite pins 83, 84 (Figs. 5 and 11) integral therewith and adapted to pass through a pair of notches or slots 85, 86 cut in the edge of shelf 82. As Figs. 3 and 4 show, the notches or slots 85, 86 are in a line which is at an angle of about 45° relative to the line of pins 83, 84, so that the die assembly must be turned about 45° to bring pins 83, 84 into registry with the notches or slots to permit the dough can to rise. In the normal position (Figs. 1–3) the dough can may neither rise nor descend nor turn. To permit any turning, the gravity latch 81 must be manually lifted; then the dough can may be turned, and once the pins 83, 84 register with the notches or slots, the dough can may be raised with the die assembly. The die assembly is of course removable from the dough can after both the spring latch pins 39, 40 are pulled out manually.

To hold the die assembly parts against separation, once the die assembly has been taken off the dough can, a stud 87 (Fig. 11) having a head 88 and a reduced screw threaded portion 89 is passed through a bore 90 in annular collar 64, so that collar 64 may slide on stud 87. The reduced portion 89 passes through a bore 91 in the center of the heavy metal collar 35 (see Fig. 6) and a wing nut 92 is threaded on said reduced portion 89. Thus the slidable parts of the die assembly are held on the stationary parts when the die assembly is separated from the dough can which normally supports it. While the stroke of these slidable parts is not usually more than one-half inch, and frequently is less, the position of head 88 on stud 87 (Fig. 11) permits a considerable adjustment of the stroke. By removing wing nut 92, the slidable sleeves may be slid off the die tubes, and the several parts of the die assembly are then easily cleaned and inspected for wear, etc. Usually it is preferable to raise the dough can out of the way when the die assembly has been removed. To facilitate this, a set of vertical guides 93, 94, 95, 96 are fixed to the frame of the machine, as indicated in Figs. 1 and 2, and complemental wings 97, 98 fixed to and projecting from the dough can engage the guides to insure a straight rise or descent of the dough can. This is a great convenience, as it is sometimes necessary to stop all production and examine and adjust parts of the machine or even disassemble some parts.

As shown in Bergner No. 1,727,857 and other patents, the doughnut shape when extruded falls by gravity into a bath of hat cooking fat, where it is made to travel in a circular path while being cooked, and ultimately is discharged onto a chute or conveyor for further processing.

Employing the principles of the above described die attachment, it is apparent that three-ringed, four-ringed, six-ringed or multi-ringed doughnuts may be formed in lieu of the five-ringed doughnut shown in Fig. 12. There is, of course, a limit to the number of rings which may be put together, also there are limits (maximum and minimum) to the sizes of the individual rings. The five-ringed doughnut shown is the product presently preferred by me. The doughnuts made by the invention are characterized by thorough cooking, because the hot fat cooks the interior more completely than is the case with commercial doughnuts, so that products of the invention are more digestible and have a different flavor sometimes described as "nut-like." Another advantageous feature of the product is that it may be easily broken or parted along the junction areas P of the rings, and when so parted, the rings form convenient mouthfuls, being easily handled as they are each "bite-size." The lines of parting are indicated approximately by the dot-and-dash lines in Fig. 12.

What I claim is:

1. A process of making thoroughly cooked doughnuts having more than three holes, comprising simultaneously extruding at least three rings of dough through closely adjacent substantially vertical die tubes, the dough being of sufficient plasticity to permit the dough rings as they separate from the die tubes to coalesce; cutting off the coalesced dough rings simultaneously as they move away from the die tubes, whereby each of the dough rings will join with the two dough rings on opposite sides, so that all the dough rings are united to make a single unitary doughnut shape of more than three holes; and then dropping said doughnut shape into hot cooking fat; the thickness of the doughnut shape throughout being such that the heat from the cooking fat will penetrate to the center of all the convolutions of said doughnut shape and the entire doughnut shape will be cooked all the way through without blackening its exterior.

2. The invention defined in claim 1, with the additional step of positively restricting the flow of the dough toward the areas of joinder or coalescence of the dough rings, so that considerably less dough from any one of the die tubes flows toward that area, so that no knobs or protuberances of dough are formed in said areas due to the piling up of the dough in the coalescing movement.

References Cited in the file of this patent

UNITED STATES PATENTS

| | | |
|---|---|---|
| 220,379 | Holmes | Oct. 7, 1879 |
| 249,227 | Dosh | Nov. 8, 1881 |
| 534,106 | Hueg | Feb. 12, 1895 |
| 1,727,857 | Bergner | Sept. 10, 1929 |
| 2,199,825 | Kretchmer | May 7, 1940 |
| 2,536,649 | Lindsey | Jan. 2, 1951 |
| 2,772,643 | Coyne | Dec. 4, 1956 |